July 15, 1952 R. J. INGHAM, JR., ET AL 2,603,086
BEVERAGE TESTING APPARATUS
Filed April 4, 1947 5 Sheets-Sheet 1

Inventors,
Robert J. Ingham, Jr.,
Samuel Kahn,
by Roberts Cushman & Grover
Attys.

July 15, 1952 R. J. INGHAM, JR., ET AL 2,603,086
BEVERAGE TESTING APPARATUS
Filed April 4, 1947 5 Sheets—Sheet 2

Inventors,
Robert J. Ingham Jr.,
Samuel Kahn,
by Roberts Cushman & Graves
Attys.

Fig. 7.

July 15, 1952     R. J. INGHAM, JR., ET AL     2,603,086
BEVERAGE TESTING APPARATUS Filed April 4, 1947                                5 Sheets—Sheet 4

Inventors,
Robert J. Ingham Jr.,
Samuel Kahn,
by Roberts Cushman & Grover
Attys.

July 15, 1952 R. J. INGHAM, JR., ET AL 2,603,086
BEVERAGE TESTING APPARATUS

Filed April 4, 1947 5 Sheets—Sheet 5

Inventors,
Robert J. Ingham Jr.,
Samuel Kahn,
by Roberts Cushman & Coover
Attys.

Patented July 15, 1952

2,603,086

UNITED STATES PATENT OFFICE 2,603,086

BEVERAGE TESTING APPARATUS

Robert J. Ingham, Jr., Fairfield, and Samuel Kahn, Bridgeport, Conn., assignors to Manning, Maxwell & Moore, Incorporated, New York, N. Y., a corporation of New Jersey Application April 4, 1947, Serial No. 739,494

15 Claims. (Cl. 73—53)

This invention relates to testing apparatus and more especially to apparatus for determining the amount of free carbon dioxide dissolved in carbonated beverages. Soft drinks owe their sparkle, tang, and to a large degree their palatability to dissolved carbon dioxide. The amount of free carbon dioxide gas present in the liquid varies with the temperature and pressure. Thus, at any given temperature, the amount of dissolved carbon dioxide available to impart the desired characteristics to the drink may be ascertained by measuring the pressure exerted by the gas.

When tightly bottled, the carbon dioxide contents of the beverage remain substantially unchanged until the bottle is uncapped, but when such beverages are dispensed from a vending machine into an open cup, the adjustments on the machine controlling the amount of dissolved carbon dioxide may change so as to result in an insipid drink or an overly carbonated drink. It has thus become customary for those who are concerned in the vending of such drinks from dispensing apparatus (automatic or otherwise) to test the drink from time to time in order to determine whether the apparatus is properly functioning to insure the delivery of palatable drink, in other words, to determine by actual test whether the drink delivered contains the proper amount of free carbon dioxide gas. Heretofore it has been necessary for the inspector to determine the pressure and the temperature of the sample and then, by reference to a chart, find the number of volumes of gas dissolved in the sample.

The present invention has for its principal object the provision of portable testing apparatus whereby a portion of beverage, delivered by dispensing apparatus, may be tested accurately and quickly to determine whether it has the proper amount of dissolved gas. A further object is to provide testing apparatus comprising indicating means which shows directly the volume of dissolved gas without reference to a chart or other extraneous means. A further object is to provide testing apparatus which independently shows the temperature and gas pressure of the sample and which has simple means whereby the gas pressure in the sample container may be reduced to atmospheric. A further object is to provide testing means so designed as to make it possible to test the beverage for carbon dioxide content regardless of the temperature (within reasonable limits). A further object is to provide a testing apparatus for the purpose described, which is compact and readily portable, which is easy to use and accurate in its determinations, and which is simple and inexpensive but rugged and durable.

Other and further objects and advantages of the invention will be pointed out in the following more detailed description and by reference to the accompanying drawings wherein.

Referring to the drawings, the numeral 1 indicates the protective housing for the indicating mechanism. The indicating mechanism is carried by a base B and when the testing apparatus is in use, the base B is assembled leaktight with a cup or receptacle 2 in which the sample of liquid to be tested is placed before assembly of the parts 1 and 2.

Figure 7:
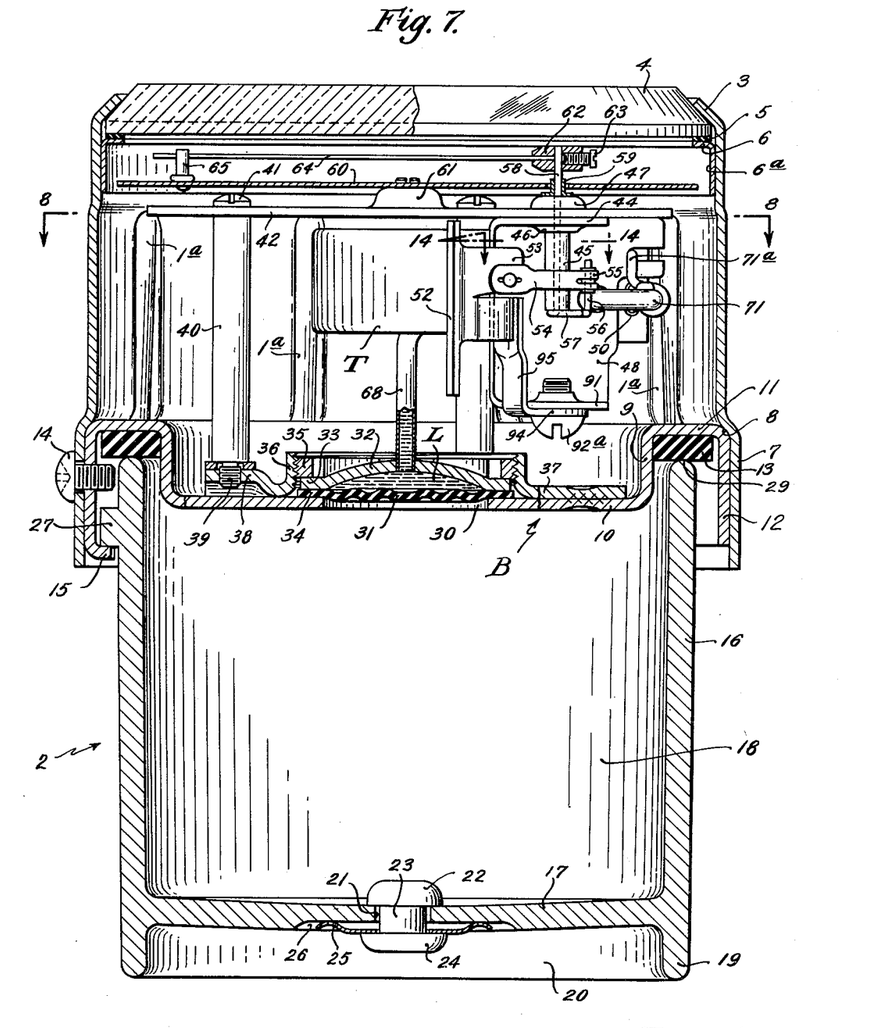
Fig. 7 is a vertical section substantially on the line 7—7 of Fig. 8 illustrating the device shown in Fig. 1, but to larger scale, and with certain parts in elevation.

The protective housing comprises a generally cylindrical shell which may be of pressed sheet metal or a moulded plastic or the like, and which is open at top and bottom and which has an inwardly inclined flange 3 at its upper margin constituting a bezel ring for retaining the transparent panel 4, for example a glass disk (Fig. 7), in assembly with the shell of the housing. This disk rests upon a resilient packing ring 5 of rubber or the like, which in turn rests upon the horizontal annular flange 6 forming part of a ring 6ª which is brazed, welded or otherwise permanently secured to the inner surface of the shell of the housing. In assembling the parts, the glass panel 4 may be put in position before the flange 3 is bent inwardly, and the flange 3 may then be subjected to a spinning or other operation to turn it down against the glass. Alternatively the flange 3 may first be made and the glass panel inserted from the bottom of the housing and the ring 6ª put in place and brazed or welded to or merely force fitted into the shell.

Figure 16:
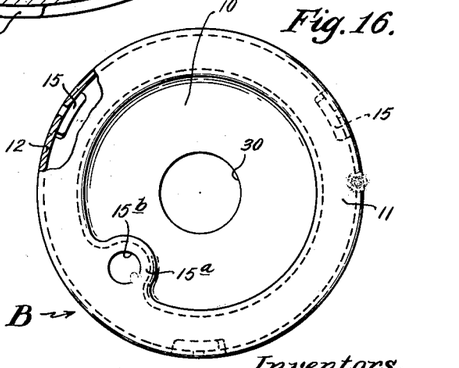
Fig. 16 is a plan view, partly in section, of the base of the protective housing for the indicating mechanism.

The lower part 7 of the shell is preferably of somewhat larger diameter than the main portion of the shell, meeting the latter to form an internal shoulder 8. Within this lower part of the shell there is arranged the base B. This base may, for example, be of pressed sheet metal or a casting or moulded plastic, and comprises the cylindrical wall portion 9 and the flat bottom 10. It also comprises the horizontal annular flange 11 extending outwardly from the upper edge of wall 9, the material then extending downwardly to form a cylindrical outer flange 12 which is of a diameter to fit snugly within the part 7 of the shell of the housing, with the bend which unites the parts 11 and 12 bearing against the shoulder 8 of the shell. Bearing against the under side of the part 11 of the base B and in the annular space between the members 9 and 12, there is arranged an annulus 13 of rubber or other suitable packing material. This annulus 13 is held in assembled relation to the base by means of a plurality of screws 14 which pass through openings in the part 7 and into threaded openings in the part 12 and whose inner ends underlie the outer part of the annulus 13, and thus prevent the annulus 13 from dropping out when the base is separated from the cup 2. The lower edge of the member 12 is provided at spaced points with inwardly directed locking lips 15. As shown in Fig. 16, three of these locking lips are provided.

The cup or container 2 (Figs. 7 and 16) is preferably a unitary mass of material. It may be of metal, moulded glass, plastic or the like, and has the substantially cylindrical side walls 16 and the bottom 17. Preferably the side walls 16 extend downwardly below the bottom, as shown at 19, so as to provide a chamber 20 beneath the bottom 17. The bottom 17 is provided, as here shown, with a port 21 which is normally closed by a valve device comprising a valve head 22 of a diameter greater than that of the port 21, and which, when in contact with the upper surface of the bottom 17, closes the port 21 to prevent the passage of fluid therethrough. The valve device also comprises a stem 23 secured to the head 22 and of a diameter less than that of the port 21 and of a length greater than the thickness of the bottom 17. The lower end of this stem is connected to a second head or button 24. A bowed spring 25, located in a recess 26 at the under side of the bottom 17, bears against the upper surface of the head or button 24 and urges the valve device downwardly so that the head 22 normally contacts the bottom 17 and closes the port. However, by upward pressure of the finger against the button 24, the head 22 may be unseated, thus providing free communication between the chamber 18 within the cup and the atmosphere. Thus, the pressure within the cup may be reduced to atmospheric merely by pressing upwardly on the head or button 24.

As illustrated the valve heads 22 and 24 are integral with the stem so that the entire valve device comprises but two parts. The heads and stem may be molded integrally from rubber or other elastic material so that it is readily possible to assemble the valve by compressing one or the other of the heads 22 or 24 and forcing it through the port.

The cup is furnished with a plurality of integral, outstanding lugs 27 symmetrically spaced about its outer surface, the lugs 27 being elongate circumferentially of the cup and having inclined lower surfaces 28 constituting cams for engagement by the lips 15 of the housing. Preferably the cam lugs 27 merge with vertical ribs 27ª extending downwardly along the sides of the cup and reinforcing the latter.

In assembling the protective housing with the cup, the cup and housing are so arranged that the lips 15 are in registry with the spaces between the free ends of adjacent lugs 27 of the cup, and the cup and housing are then moved axially toward each other until the lips are below the right-hand ends of the lugs 27, as seen in Fig. 16. The cup and housing are then so relatively rotated that the lips 15 engage the cam surfaces 28 of the lugs 27, and, by reason of the incline of these surfaces, further relative rotation causes the upper edge 29 of the cup to be brought into firm and leaktight engagement with the packing 13.

The base member B is provided with an aperture 30 (Fig. 16) of substantial size, for example, two-thirds of an inch in diameter, which is closed (Fig. 7) by a flexible diaphragm 31 of rubber or the like, above which is arranged an upwardly convex, rigid, circular diaphragm housing 32 having a marginal flange 33 which overlies the margin 34 of the diaphragm, the margin of the diaphragm resting upon the upper surface of the base member B bordering the aperture 30. An annular nut 35 has threaded engagement with an internally threaded cylindrical ring 36 forming part of a plate 37. The nut bears against the flange 33 of the diaphragm housing 32 and thereby compresses the margin of the diaphragm leaktight between the parts 10 and 33. The plate 37 is fixed to the base B, for example, by welding, rivets or the like.

This plate 37 has two or more upwardly bent portions 38 each having a screw-threaded aperture for the reception of the screw-threaded lower end 39 of a long vertical post 40. These posts 40 support a rigid, substantially horizontal plate 42 which is secured to the upper ends of the posts 40 by screws 41. The plate 42 is parallel to the central portion 10 of the base member B and is spaced above the latter a distance sufficient to provide room for the accommodation of the pressure motor and associated parts.

Figure 8:
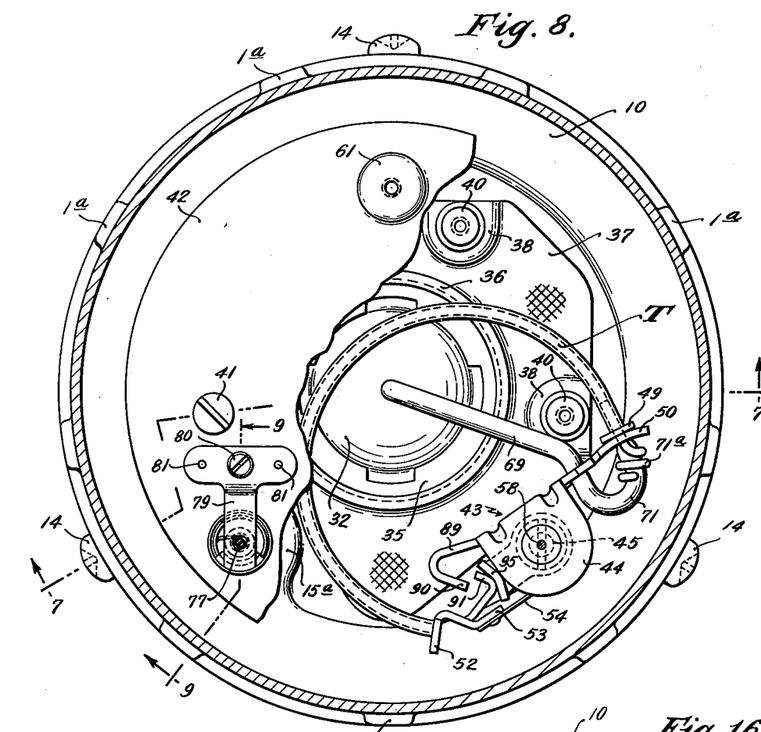
Fig. 8 is a horizontal section, partly in plan view, on the line 8—8 of Fig. 7.
Figure 9A:
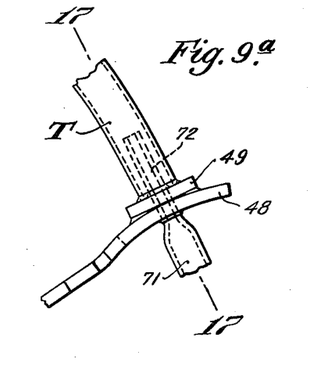
Fig. 9a is a fragmentary plan view showing the mode of connecting the Bourdon tube to its supporting bracket.
Figure 10:
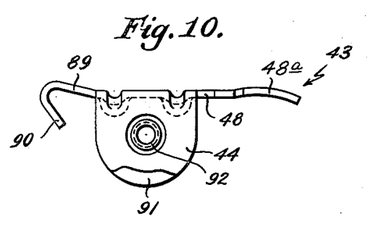
Fig. 10 is a plan view of the bracket which supports the Bourdon tube.
Figure 11:
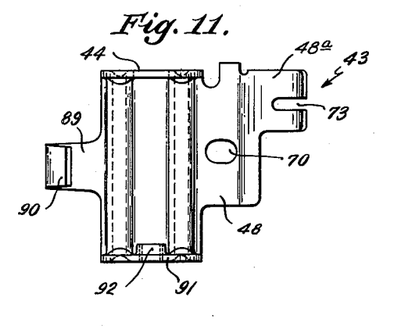
Fig. 11 is a front elevation of the bracket of Fig. 10.

A bracket 43 (Figs. 8, 10 and 11) which may, for example, be of pressed sheet metal and which is strong and rigid has an upper horizontal portion 44 provided with an opening which receives a vertically disposed elongate bushing member 45 having a peripheral shoulder 46 which bears against the under side of the bracket member 44. The bushing extends upwardly through the opening in the bracket member 44 and through an opening in the supporting plate 42, and is provided with a second head 47, formed, for example, by staking over the upper end of the bushing so as to firmly and rigidly secure the bushing and the bracket 43 to the plate 42.

Figure 17:
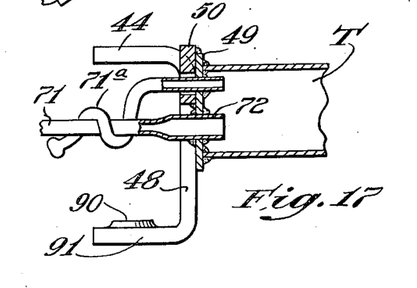
Fig. 17 is a fragmentary section on the line 17—17 of Fig. 9a, but to larger scale.

The bracket 43 has a laterally extending arm 48 (Figs. 11 and 17) provided with a horizontally elongate opening 70. An extension 48ᵃ of the arm 48 has the open ended slot 73. A rigid plate 49 (Figs. 8, 9ᵃ, 15 and 17) is secured by brazing, soldering or welding to the arm 48. This plate has a flat face and a vertically elongate aperture 50 and a circular hole 50ᵃ. The fixed or butt end of a Bourdon tube T (Figs. 8, 9ᵃ and 17), constituting the pressure-sensitive element of the pressure motor, is squared off to provide an end surface which is flat and substantially perpendicular to the axis of the tube, and this end surface is butted against the flat face of the plate 49 so that the openings 50 and 50ᵃ in the plate are within the confines of the tube end. The tube end is then fixed leak-tight to the plate by solder or welding. The flat face of the rigid plate makes possible this leak-tight union. The tube T is curved in the horizontal plane and has a tip bracket 52 (Fig. 8) secured to its movable or free end. After the tube has been fixed to the plate, the latter is placed in contact with the bracket member 48 and shifted until the pivot hole or eye in the tip bracket is accurately positioned, and then the plate is fixed to the bracket member 48. The attachment of the butt end of the Bourdon tube to the plate 49 and the attachment of the latter to the bracket are readily accomplished as a single soldering operation. By the above method of procedure, it is possible accurately to locate the pivot hole or eye in the tip bracket relatively to the mechanism actuated by the tube without the exercise of especial care as to accuracy of length or arc of curvature of the tube.

Figure 14:
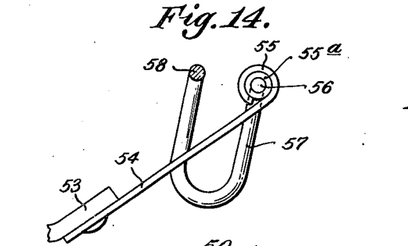
Fig. 14 is a fragmentary plan view, partly in horizontal section, showing the means for connecting the tip of the Bourdon tube to the staff of the pressure-indicating pointer.
Figure 15:
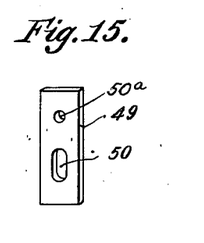
Fig. 15 is a perspective view of a plate used in connecting the Bourdon tube to its supporting bracket.

The tip bracket 52 is secured to the free end of the tube by welding or solder so as to close the end of the tube, and has an arm 53 to which is secured one end of a flexible link 54 (Fig. 14). The opposite end of this link 54 is bent to form the bearing eye 55 in which is arranged a bearing sleeve 55ᵃ. A crank pin 56 turns within the sleeve 55ᵃ. This crank pin is vertical and, as illustrated, forms part of an integral length of stiff wire which is bent to form the U-shaped horizontal portion 57, and also to form the staff portion 58 (Fig. 7) parallel to the pin 56 but spaced from the latter and which turns within the bushing 45. Above the head 47 of the bushing 45 the staff 58 is provided with a thrust bearing, conveniently an eyelet having a force fit upon the staff and whose horizontal flange bears upon the upper surface of the head 47 of the bushing. The staff 58 extends up above this eyelet 59 and through an opening in a dial 60 which is mounted upon upwardly directed bosses 61 forming integral portions of the plate 42. A socket 62 is adjustably secured to the upper end of the staff 58 by means of a set screw 63. This socket holds the pointer 64 which swings about the vertical axis of the staff 58 over the face of the dial 60, and which cooperates with an arcuate scale 65 (Fig. 2) on the upper surface of the dial indicating pressures, the movement of the pointer toward the zero end of the scale being limited by a stop 66 projecting upwardly from the dial.

Figure 13:
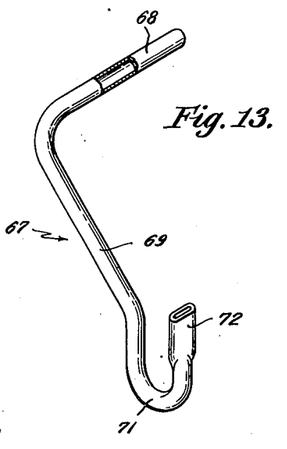
Fig. 13 is a perspective view of the supply tube or conduit leading to the Bourdon tube.

The chamber defined by the diaphragm 31, and the diaphragm housing 32, communicates with the interior of the Bourdon tube by means of a conduit, here shown as consisting of a length of tubing 67 (Fig. 13) of any appropriate material, for example copper. This tubing has the substantially straight lower portion 68 (Fig. 7) which is fitted within a central aperture in the diaphragm housing 32 and is secured leak-tight therein, for example, by brazing or solder. The pipe or conduit 67 extends upwardly and has a substantially horizontal portion 69 (Fig. 8) lying within the confines of the Bourdon tube, and has a substantially U-shaped terminal portion 71 whose free end portion is vertically flattened, as indicated at 72. The pipe passes through the opening 70 (Fig. 11) in the lateral extension 48 of the bracket 43, and the flattened end 72 of the pipe (located below the lower edge of the extension 48ᵃ), passes into the vertically elongate slot 50 in the plate 49, and is permanently secured, by solder or brazing, to the plate 49. One end of a capillary filling tube 71ᵃ (Fig. 8) is fitted into the hole 50ᵃ in the plate 49 and secured therein by soldering, brazing or welding. This may be done at the same time that the tube T is attached to plate 49. The free end portion of the tube 71ᵃ passes through the slot 73 in the bracket extension 48ᵃ. Through this filling tube 71ᵃ, liquid L (Fig. 7) is introduced in a manner well known to those skilled in the art so as completely to fill the chamber defined by the diaphragm 31 and the diaphragm housing 32, the conduit 67 and the Bourdon tube. After the liquid has thus been introduced so as completely to displace the air within the several parts just enumerated, the free end of the capillary tube 71ᵃ is sealed and the end portion of the tube may, for convenience, but not necessarily, be wrapped about the terminal portion 71 of the conduit 67.

Figures 1, 2, 3, 4:
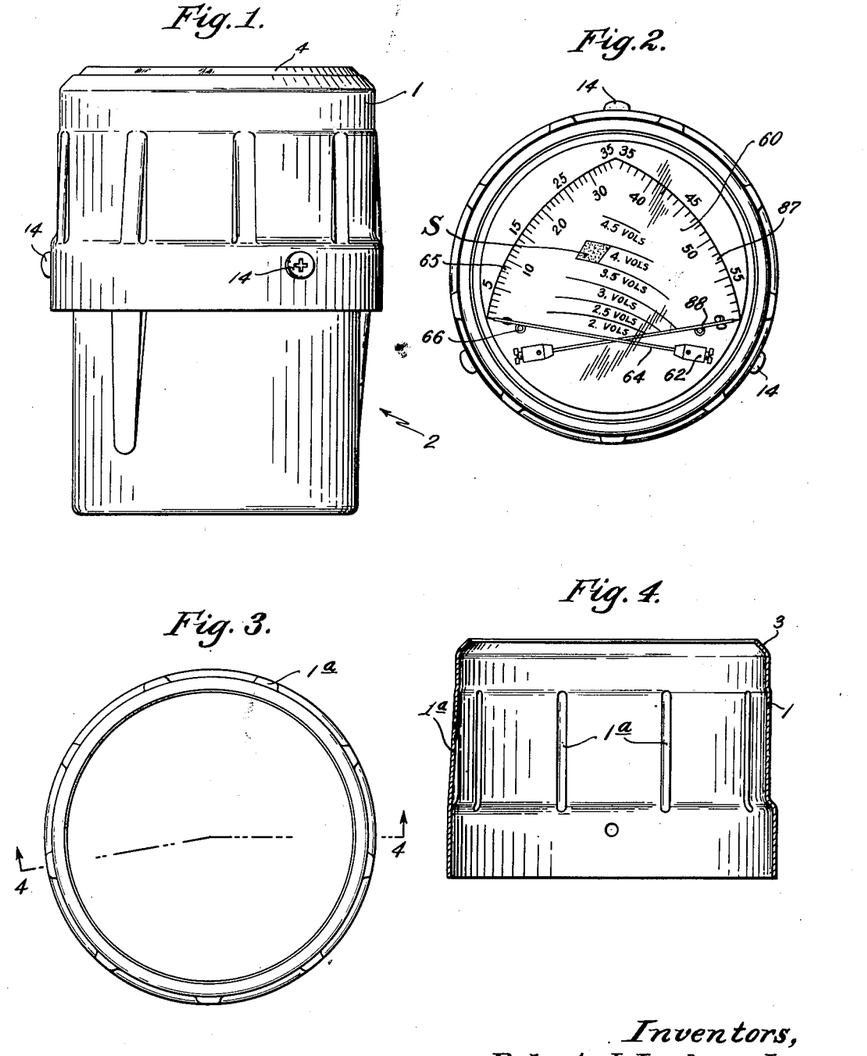
Figure 1 is a side elevation of the testing apparatus of the present invention with its parts assembled and in readiness for use.
Fig. 2 is a plan view of the device shown in Fig. 1.
Fig. 3 is a plan view of the shell of the protective housing for the indicator mechanism before assembly with other parts.
Fig. 4 is a vertical section on the line 4—4 of Fig. 3.
Figures 5, 6, 9:
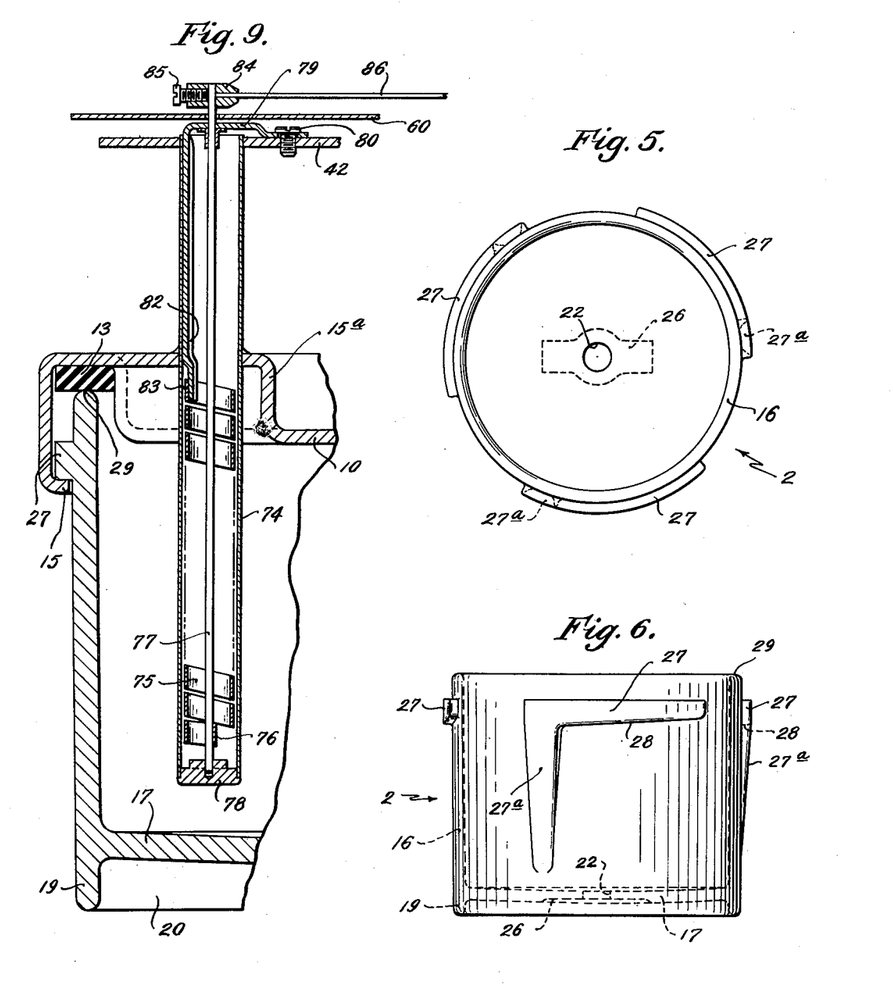
Fig. 5 is a plan view of the cup or receptable which is designed to receive the sample of liquid to be tested.
Fig. 6 is a side elevation of the cup or receptacle shown in Fig. 5.
Fig. 9 is a fragmentary, vertical section, to substantially the same scale as Fig. 7, on the line 9—9 of Fig. 8.

The base B is provided with an inwardly and upwardly directed boss 15ᵃ (Figs. 9 and 16) having an opening 15ᵇ therein which receives a vertically elongate, thin-walled metal tube 74 (Fig. 9) which is brazed or otherwise permanently secured leaktight in the opening 15ᵇ and which houses the temperature-responsive element of the temperature motor and protects the latter from direct contact with the contents of the cup. The temperature-responsive element is a helical bimetallic coil 75 whose lower end is fixed at 76 to a rotary shaft 77 whose lower end turns in a step bearing formed in a plug 78 which is fixed leak-tight as by brazing or solder in the lower end of the tube 74, so as to seal the lower end of the tube. The upper end of the tube is disposed in an opening in the supporting plate 42. The shaft 77 extends upwardly beyond the upper end of the tube 74 and finds a bearing in an opening in a bracket member 79 which is secured to the plate 42 by means of a screw 80. The bracket 79 has a pair of downwardly directed tits 81 (Fig. 8) which enter corresponding sockets in the upper surface of the plate 42, thereby to hold the bracket 79 in fixed position. The bracket 79 has a vertically elongate arm 82 (Fig. 9) which extends downwardly within the tube 74 and to whose lower end the upper end 83 of the bimetallic coil is fixedly secured. A socket 84 is adjustably secured to the upper end of the shaft 77 by means of a set screw 85 and carries the temperature indicating pointer 86, which sweeps over the dial 60 (Fig. 2), the latter being provided with an arcuate, graduated scale 87 indicating temperatures. The movement of the pointer 86, in response to increasing temperatures, is limited by a stop pin 88 projecting upwardly from the dial. Since the pointers 64 and 86 swing about axes which are parallel but spaced apart a substantial distance, the pointers cross each other as they swing through intersecting arcs and their point of intersection moves transversely over the dial. As illustrated in Fig. 2, the dial is provided with indications for convenience in showing the volume of gas contained in the liquid being tested, and is provided with a shaded area S corresponding to that gas volume which it is desired to maintain.

Figure 12:
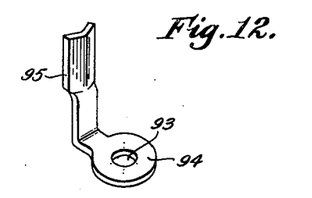
Fig. 12 is a perspective view illustrating an adjustable stop for limiting the movement of the tip of the Bourdon tube as the pressure decreases.

The bracket 43 is provided with a laterally extending, substantially rigid arm 89 (Figs. 8 and 11) whose free end portion is bent to provide the hook 90. This hook is designed to be engaged by a complemental hook 91, here shown as an integral portion of the tube tip 52. Engagement of the hook 91a with the hook 90 limits movement of the tube tip in response to increasing pressures, thus preventing overloading and distortion of the Bourdon tube. The bracket 43 has a substantially horizontal member 91 at its lower end which has a central, upwardly directed boss 92 (Fig. 17) having a screw-threaded opening which receives a screw 92a (Fig. 7) by means of which a limiting stop member is secured to the bottom portion 91 of the bracket. This stop member (Fig. 12) comprises a substantially circular annular lower portion 94 having a central opening 93 which receives the shank of the screw 92a, and also having a vertically extending stop arm 95 which is designed to be engaged by the bend of the hook 91, thereby to limit movement of the tube tip in response to decreasing pressures. By loosening the screw 92a and turning the stop device, comprising the arm 95, the zero position of the tube tip may be varied.

In using the instrument, the operator disengages the cup 16 from the housing and fills the cup with the liquid to be tested. The cup and housing are then assembled and by relative rotation the joint between them is sealed leaktight. Since the introduction of the base member B into the top of the cup, particularly if the cup has been completely filled with liquid, may cause a substantial rise in pressure of the liquid within the cup, the valve 22 has been provided. If, when the cup and housing have been assembled, the pressure pointer 64 indicates any pressure, the operator presses upwardly upon the button 24, thus opening the valve 22 and reducing the pressure within the cup to atmospheric. The operator then preferably shakes the cup so as to facilitate the separation of the gas from the liquid. If the contents of the cup are at a temperature outside of the proper range for testing, as may be noted by observing the temperature pointer 86, the cup may be warmed or cooled so as to bring the temperature pointer within the desired range, as shown by the scale 87. If, after the temperature has thus been brought within the proper range the pointers intersect over the shaded area S of the dial, the user knows that the liquid contains the proper amount of gas. On the other hand, if while the pointer 86 indicates the proper temperature range, the intersection of the pointers fall outside of the shaded area S, the user knows the quantity of gas which is actually present but that the gas content of the liquid is not of the desired amount.

It is to be understood that the pointers can intersect at a great number of points on the dial and still indicate that a correct amount of gas is present in the beverage. The reason for the shaded area, however, is to indicate that not only the correct amount of gas is present, but that the temperature of the drink is being kept at a desired level. This shaded area is simply a representative zone, which one vendor of beverages may desire to use on a specific type of drink. The same vendor of another type of drink requiring more or less carbonation, such as a cola drink as compared to an orange drink, might have a shaded area in a different section. As a matter of fact, the dial need not have a shaded area, but simply volume lines. Then, if a manufacturer's standard for a beverage was, for example, from 3.5 volumes to 4.0 volumes, as long as the pointers intersected between these two lines, the volume of gas would be correct in the beverage.

The instrument thus provided is simple, light in weight and easily applied in making a test, and provides ready means for making the test without resort to extraneous devices, such as charts or the like, in order to obtain the proper reading.

While one desirable embodiment of the invention has herein been illustrated by way of example, it is to be understood that the invention is broadly inclusive of any and all modifications falling within the scope of the appended claims.

We claim:

1. Testing apparatus of the kind wherein two independently movable index elements, actuable by pressure and temperature motors comprising elements which are sensitively responsive respectively to pressure and temperature changes, are arranged within a protective housing and movable, in paths which overlap, relatively to a dial marked at the overlapping portions of said paths to indicate a third condition, the housing having a base which supports the motors, an open-topped cup for holding a sample of liquid to be tested, means for removably attaching the cup leak-tight to the base of the protective housing, the temperature responsive element of the temperature motor being within the confines of the cup when the parts are assembled, and means for transmitting fluid pressure subsisting within the cup to the pressure-sensitive element of the pressure motor.

2. Testing apparatus of the kind wherein two independently movable index elements, actuable by pressure and temperature motors comprising elements which are sensitively responsive respectively to pressure and temperature changes, are arranged within a protective housing and movable, in paths which overlap, relatively to a dial marked at the overlapping portions of said paths to indicate a third condition, the housing having a base which supports the motors, an open-topped cup for holding a sample of liquid to be tested, means for uniting the cup and base in leaktight assembly, a housing for the temperature-sensitive element of the temperature motor which depends from the base into the cup when the parts are assembled, the base having therein an aperture, a flexible diaphragm, exposed to the interior of the cup, closing said aperture, a rigid housing defining a chamber whose floor is constituted by the diaphragm, a conduit which extends from said chamber to the pressure-sensitive element of the pressure-responsive motor, and a body of liquid filling said chamber and conduit thereby to transmit pressure variations from the interior of the cup to the motor.

3. Testing apparatus of the kind wherein two independently movable index elements, actuable by pressure and temperature motors comprising elements which are sensitively responsive respectively to pressure and temperature changes, are arranged within a protective housing and movable, in paths which overlap relatively to a dial marked at the overlapping portions of said paths, to indicate a third condition, an open-topped cup for holding a sample of liquid to be tested, means for releasably uniting the cup and base in leaktight assembly, the base having an aperture, a rigid diaphragm-housing fixed above said aperture, a flexible diaphragm constituting the bottom wall of the diaphragm-housing and which is exposed to the pressure within the cup, the pressure-sensitive element of the pressure motor being a Bourdon tube, a rigid conduit extending from the diaphragm-housing to the interior of the Bourdon tube, a body of liquid filling the Bourdon tube, said conduit and the diaphragm-housing, and a sleeve depending from the base into the cup when the parts are assembled and within which is arranged the temperature-sensitive element of the temperature motor.

4. Testing apparatus of the kind wherein two independently movable pointers, actuable by pressure and temperature motors comprising elements which are sensitively responsive respectively to pressure and temperature changes, are arranged within a protective housing and movable, in paths which overlap, relatively to a dial marked at the overlapping portions of said paths to indicate a third condition, an open-topped cup for holding a sample of liquid to be tested, means releasably uniting the cup and base in leaktight assembly, the motors being responsive respectively to the pressure and temperature of the contents of the cup, and means operative to prevent actual contact of the contents of the cup with the pressure and temperature-responsive elements of the respective motors.

5. Testing apparatus of the kind wherein two independently movable index elements, actuable by pressure and temperature motors comprising elements which are sensitively responsive respectively to pressure and temperature changes, are arranged within a protective housing and movable, in paths which overlap relatively to a dial marked at the overlapping portions of said paths to indicate a third condition, an open-topped cup for holding a sample of liquid to be tested, means releasably uniting the cup and base, a fluid-tight holder for the heat-responsive element of the temperature motor, said holder being carried by the base and depending into the cup when the parts are assembled, the base having therein an aperture, closed leaktight by a flexible diaphragm, the under surface of the diaphragm being exposed to the contents of the cup, and means operative to transmit motion of the diaphragm to the pressure motor.

6. In combination in testing apparatus of the class described wherein a pressure indicating pointer is mounted in a protective housing, the latter having a bottom member, an open-topped cup for holding a sample of liquid to be tested, means releasably uniting the cup leaktight to the bottom member, supporting posts carried by the bottom member, a plate mounted on said posts in spaced relation to the posts, a bracket carried by the plate and located between the plate and bottom member, a Bourdon tube mounted on the bracket, the tube having a tip and means for transmitting motion from the tip to the pressure indicating pointer, means carried by the bottom member for limiting movement of the tube tip in response to increasing pressure, an adjustable stop carried by the bracket operative to limit motion of the tube tip in response to decreasing pressure, and means for transmitting pressure variations from the interior of the cup to the Bourdon tube.

7. Testing apparatus of the kind wherein two independently movable index elements, actuable by pressure and temperature motors comprising elements which are responsive respectively to pressure and temperature changes, are arranged within a protective housing and movable in paths which overlap relatively to a dial marked at the overlapping portions of said paths to indicate a third condition, and having an open-topped container for a sample of fluid to be tested, characterized in that the protective housing comprises a base portion designed for pressure-tight but removable connection to the fluid container and which supports the motors for actuating the respective index elements.

8. Testing apparatus of the kind wherein two independently movable index elements, actuable by pressure and temperature motors comprising elements which are sensitively responsive respectively to pressure and temperature changes, are arranged within a protective housing and movable in paths which overlap relatively to a dial marked at the overlapping portions of said paths to indicate a third condition, and having an open-topped container for a sample of fluid to be tested, characterized in that the protective housing comprises a base portion designed for pressure-tight but removable connection to the fluid container and which supports the motors, means protecting the pressure and temperature-sensitive elements of the respective motors from direct contact with the contents of the cup, and manually actuable means to vent the container, thereby to reduce the pressure within the latter.

9. Testing apparatus of the kind wherein two independently movable index elements actuated by motors comprising elements which are sensitively responsive respectively to two pressure and temperature changes, are arranged within a protective housing and movable in paths which overlap relatively to a dial marked at the overlapping portions of said paths to indicate a third condition, and having a container for a sample of fluid to be tested, characterized in that the protective housing comprises a base portion designed for pressure-tight but removable connection to the fluid container and which supports the motors for actuating the respective index elements, the container having a port in its wall and a valve which normally closes the port, the valve being manually movable thereby to open the port so as to vent the interior of the container to the atmosphere.

10. Testing apparatus of the kind wherein two independently movable index elements actuable by motors comprising elements which are sensitively responsive respectively to pressure and temperature changes, are arranged within a protective housing and movable in paths which overlap relatively to a dial marked at the overlapping portions of said paths to indicate a third condition, and having a container for a sample of fluid to be tested, characterized in that the protective housing comprises a base portion designed for pressure-tight but removable connection to the fluid container and which supports the motors for actuating the respective index elements, a housing for the temperature-sensitive element of the temperature motor depending from the base so that it is exposed to the temperature of the contents of the container when the parts are assembled, and means for transmitting pressure from fluid within the container to the pressure sensitive element of the pressure motor, the container having a port in its wall and a valve normally closing said port.

11. In combination in testing apparatus wherein a pressure indicating pointer is swung about a vertical axis over a horizontal dial by a motor including a pressure-sensitive element, a protective housing for the pointer, dial and motor comprising a generally cylindrical shell closed at its top by a transparent panel through which the pointer and dial are visible and having an internal shoulder at its lower portion but spaced from its lower edge, a base fixed within the lower portion of the shell and bearing against said internal shoulder, an open-topped cup for holding a sample of liquid to be tested, the upper portion of the cup being of a diameter to fit up within the lower portion of the cylindrical shell, means for removably uniting the cup and base in leak-tight assembly, the base constituting a support for the motor and having a central aperture closed by a flexible diaphragm, a diaphragm housing having a marginal flange which is secured leak-tight to the upper surface of the base bordering said aperture, and means operative to transmit motion of the diaphragm in response to pressure variations in the cup to the pressure-sensitive element of the motor.

12. In combination in testing apparatus wherein a pressure indicating pointer is swung about a vertical axis over a horizontal dial by a motor including a pressure-sensitive element, a protective housing for the pointer, dial and motor comprising a generally cylindrical shell closed at its top by a transparent panel through which the pointer and dial are visible, a base fixed within the lower portion of the shell, the base constituting a support for the motor and being shaped to provide a downwardly open annular marginal pocket for the reception of yieldable packing material, means for retaining packing material within said pocket, an open-topped cup for holding a sample of liquid to be tested, the upper part of the cup being of a diameter to fit up into said annular pocket, means for removably uniting the cup and base with the upper edge of the cup in leak-tight contact with the packing, the base having an aperture closed by a flexible diaphragm, a diaphragm housing fixed to the upper surface of the base and forming a closed chamber above the diaphragm, and means for transmitting motion of the diaphragm in response to pressure variations in the cup to the pressure-sensitive element of the motor.

13. In combination in testing apparatus wherein a temperature indicating pointer is swung about a vertical axis over a horizontal dial by a motor comprising a temperature-sensitive element, a protective housing for the pointer and dial comprising a generally cylindrical shell closed at its top by a transparent panel through which the dial and pointer are visible, a base fixed within the lower part of the shell, the base being shaped to provide a downwardly open marginal annular pocket for the reception of yieldable packing material, means for retaining packing material within said pocket, an open-topped cup for holding a sample of liquid to be tested, the upper part of the cup being of a diameter to fit up into said annular pocket, means for removably uniting the cup and base with the upper edge of the cup in leak-tight contact with the packing, the base having therein an aperture through which depends a housing for the motor, said housing extending down into the cup when the cup and base are assembled and being secured leak-tight to the base where it passes down through the latter, and means for transmitting motion from the temperature-sensitive element to the pointer.

14. In combination in testing apparatus wherein a pressure indicating pointer is swung about a vertical axis over a horizontal dial by a motor comprising a pressure responsive element, a protective housing for the pointer and dial comprising a generally cylindrical shell closed at its top by a transparent panel through which the dial and pointer are visible, a base fixed within the lower part of the shell, the base being shaped to provide an annular pocket for the reception of yielding packing material, means for retaining packing material within said pocket, an open-topped cup for holding a sample of liquid to be tested, the upper part of the cup being of a diameter to fit up into said annular pocket, means for removably uniting the cup and base with the upper edge of the cup in leak-tight contact with the packing, the pressure motor being mounted upon the base and having a Bourdon tube as its pressure responsive element, means for transmitting pressure variations in the cup to the Bourdon tube, and adjustable stop means for limiting movement of the tip of the Bourdon tube thereby to determine the zero position of the pressure indicating pointer.

15. In combination in testing apparatus wherein a pointer is swung about a vertical axis over a horizontal dial by a motor device comprising an element which is sensitively responsive to variations in a certain physical condition, a protective housing for the pointer, dial and motor device comprising a shell closed at its top by a transparent panel through which the pointer and dial are visible, a base closing the shell at its lower portion, said base having a downwardly open annular pocket with packing disposed within the pocket, an open-topped cup for holding a sample of liquid to be tested, the upper portion of the cup being of a diameter to fit up within said pocket, means for removably uniting the cup and base with the upper edge of the cup in leak-tight contact with said packing, and means for transmitting variations in said physical condition which occur within the cup to the sensitive element of the motor.

ROBERT J. INGHAM, Jr.
SAMUEL KAHN.

REFERENCES CITED

The following references are of record in the file of this patent:

UNITED STATES PATENTS

| Number | Name | Date |
|---|---|---|
| 18,129 | Ashcroft | Sept. 8, 1857 |
| 581,085 | Ruppert | Apr. 20, 1897 |
| 892,886 | Prest | July 7, 1908 |
| 980,743 | Becher | Jan. 3, 1911 |
| 1,205,038 | Singer | Nov. 14, 1916 |
| 1,634,569 | Bray | July 5, 1927 |
| 1,918,258 | Fredricksen | July 18, 1933 |
| 2,044,239 | Bullock | June 16, 1936 |
| 2,239,221 | Dimmock | Apr. 22, 1941 |
| 2,266,277 | Seegers et al. | Dec. 16, 1941 |

FOREIGN PATENTS

| Number | Country | Date |
|---|---|---|
| 491,002 | France | Jan. 18, 1919 |
| 377,781 | Germany | July 3, 1921 |
| 264,873 | Great Britain | June 23, 1927 |